Sept. 14, 1965 C. N. EDWARDS 3,205,591
SELF-THREADING AUTOMATIC FILM PROCESSING APPARATUS
Original Filed Jan. 23, 1958 3 Sheets-Sheet 2

INVENTOR:
C. N. EDWARDS

BY *Homer R. Montague*
ATTORNEY

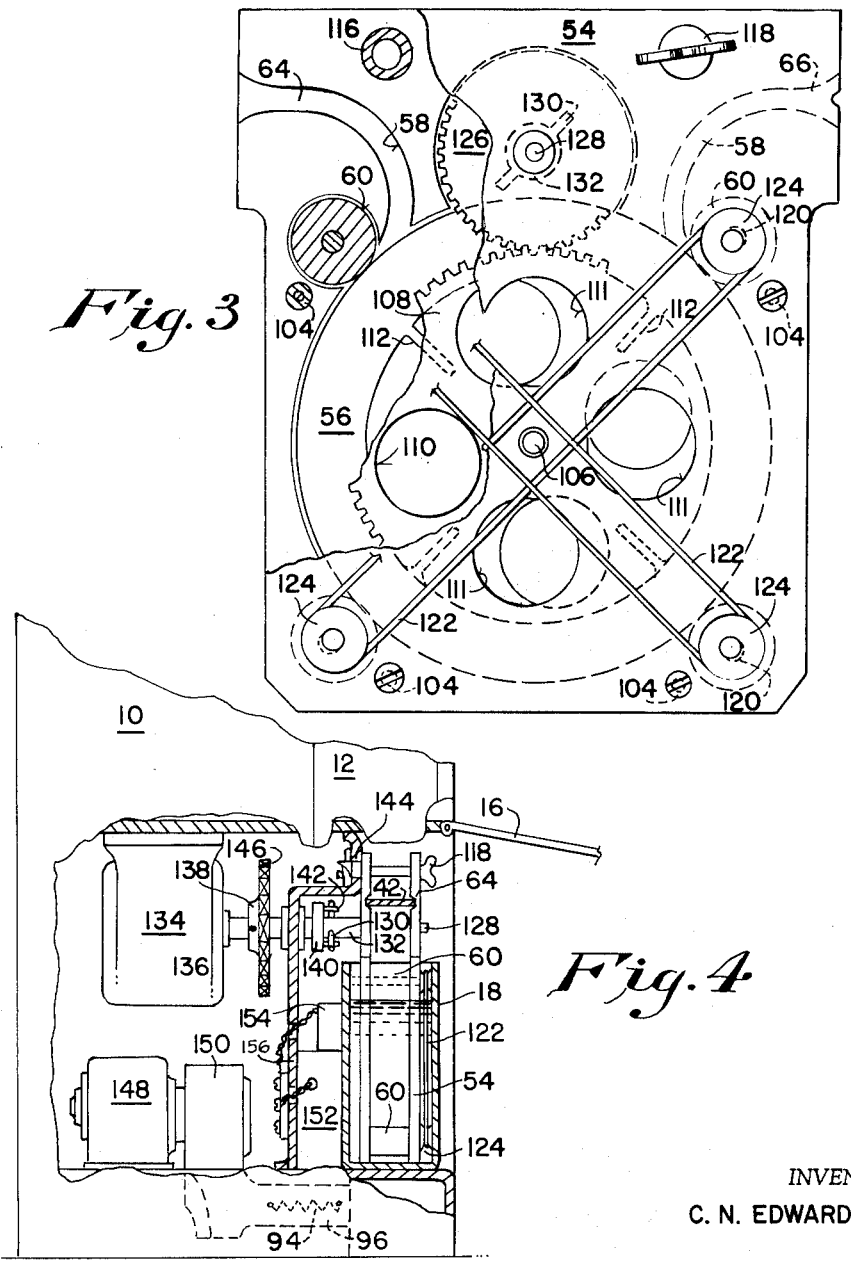

United States Patent Office 3,205,591
Patented Sept. 14, 1965

3,205,591
SELF-THREADING AUTOMATIC FILM
PROCESSING APPARATUS
Charles N. Edwards, Huntington, N.Y., assignor to Fairchild Camera and Instrument Corporation, a corporation of Delaware
Original application Jan. 23, 1958, Ser. No. 710,662, now Patent No. 3,096,701, dated July 9, 1963. Divided and this application Aug. 15, 1962, Ser. No. 223,859
2 Claims. (Cl. 34—114)

This application is a division of my copending application Serial No. 710,662, filed January 23, 1958, now Patent No. 3,096,701.

This invention pertains generally to automatic film-processing equipment, and more particularly to automatic film-processing apparatus designed for rapid handling of roll type photographic film. A particular feature of this invention is the novel film-advancing or feeding system included therein.

In the general art of the development and other processing of photographic films and the like there is no stringent need for shortening the time which may elapse between the exposure of the film and the development thereof. Especially is this true with respect to amateur photography, where days or even weeks may pass before the exposed film is brought to the dealer for processing.

In some applications, however, there arises a requirement for the development of a roll of photographic film of the like as soon as is practicable after exposure thereof. One example of the use of photographic recording techniques wherein such a requirement for speed exists is in the photo-reconnaissance missions performed by military aircraft, the value of which reconnaissance often depends upon the freshness or timeliness of the information recorded during the mission. Another and perhaps more important example of the need for short time-lapse between exposure and development is the use of gun cameras in military aircraft, both in training missions and in actual combat. The significance of the recorded information is greatly enhanced when the pilot or gunner is able to observe the record of his performance as soon as the mission is completed. For example, where a developing apparatus is operated in the pilot's ready-room or at some other point equally accessible to crewmen returning from a mission, the films exposed during a mission may be brought directly to the apparatus for processing, and the particular crewmen concerned with a given film may study the film while the memory of their actions during the flight is still fresh in their minds.

In order that an apparatus for developing these films may satisfactorily be operated in a pilot's ready room or the like, it is desirable, if not in fact necessary, that such apparatus be very compact and light in weight so as to occupy a minimum of space, and so that it may be readily moved from place to place.

Another feature inherently necessary in such processing apparatus is that the operation of the equipment be sufficiently simple and automatic to enable the crewmen, some of whom may not be skilled in the art of developing photographic films, to obtain satisfactory development of their films with a minimum of attention to detail in such operation.

In addition, such developing apparatus should be capable of performing its function as rapidly as possible, since a single gun camera, for example, might itself expose a plurality of rolls of film in a given mission. The need for speed in film processing in such application becomes even more evident upon consideration of the fact that most modern aircraft have more than a single gun emplacement, and furthermore a single ready room usually serves the crews of each of the plurality of aicraft which normally make up a given mission. While the military uses for high speed processing equipment as just mentioned are of significant importance, it will be obvious to those skilled in the art of photography that such high speed processing equipment will also have numerous valuable commercial applications, not only in aerial work such as surveys, prospecting and like fields, but also in general photographic operations in which exposed film strips need to be reduced to finished images in a minimum time. For maximum utility, such apparatus should be compact, relatively simple to operate by skilled or unskilled personnel, and no larger than is necessary, to conserve room or vehicle space.

It is accordingly a principal object of this invention to provide a compact, light-weight apparatus for the rapid automatic processing of photographic films or the like.

Another object of the invention is to provide an automatic apparatus for the rapid processing of photographic films or the like wherein the operation of the apparatus does not require the attention of one skilled in the art of processing photographic films.

Yet another object of this invention is to provide an automatic apparatus for advancing roll film or the like through a plurality of tanks containing appropriate liquids for achieving development of the images exposed on the film, and through a drying compartment for subsequent delivery of the dry, developed film to a suitable storage or take-up reel.

A further object of this invention is to provide a novel film advancing means for each of the plurality of liquid-containing tanks in an automatic processing apparatus for roll-type photographic film or the like.

In accordance with the present invention, the above and other objects are achieved by means of a processing apparatus designed for automatic operation and having means for rotatably mounting a roll of exposed but undeveloped film, a plurality of aligned tanks for holding the several appropriate liquids connected with the particular process desired, a novel film-feeding mechanism in each of said tanks and protruding therefrom in alignment with each other in a manner such as to provide a continuous feed through the several tanks, a drying compartment having film-guiding and advancing means for accepting the film from the last of the several film-drive units in the aligned tanks, and a take-up reel for accepting film from the drying compartment under the control of a novel take-up drive.

The film-feed units which are associated with the plurality of tanks each include a pair of parallel plates having a drive wheel mounted therebetween for rotation about an axis perpendicular to the plates. In registry with a greater portion of the periphery of the drive wheel are a pair of parallel film-guiding grooves, one in each of the two facing surfaces of the two plates. These grooves engage the edges of the film that is introduced to the unit and guide it from a film entrance port in one pair of edges of the plates, around a portion of the periphery of the drive wheel, and out a film exit port in another pair of edges of the plates. In order to keep the film thus guided through the device in contact with the drive wheel, a plurality of idler wheels are mounted between the plates and adjacent to the periphery of the drive wheel. These idlers are mounted for rotation about axes parallel to the axis of the drive wheel, and are free to move in directions radial of the drive wheel under the influence of resilient means urging the idlers toward the center of the drive wheel. Thus, film is introduced at the film entrance port and is pushed into the unit along the film-guiding grooves until it is gripped between the drive wheel and the first of the idler wheels which resiliently bear upon the drive wheel. Rotation of the drive wheel causes the film to be self-feeding through the remainder of the unit and out of the film exit port.

The drying compartment includes an endless belt of porous material which extends between a pair of rotary drums, and an apertured film-guiding plate spaced from and substantially parallel to the belt as the latter travels around the two drums. Heated air is directed against the apertures in the film guide to dry the film as it passes through the drying compartment with the aid of the endless belt, the latter being driven by rotation of one of the drums in synchronism with the drive of the film-feed units in the preceding plurality of tanks. As the heated air impinges upon the film, the latter is pressed against the endless belt to effect a friction drive between the two.

As the dry film issues from the drying compartment, it proceeds to a take-up reel or spool which is provided with the following novel drive means. Supporting the take-up reel for rotation thereon are a drive roller and an idler. The rims of the reel rest on these two rollers, and as the film diameter on the reel increases with the addition of film from the drying compartment, the fact that the drive roller is driven at a speed which is constant with respect to the film drive in the preceding units causes the take-up reel to attempt to take in film at an increasingly greater rate per revolution. To prevent an undue increase in the tension on the film as it comes from the drying compartment, the drive roller and the take-up reel are so associated that the increased pull causes slippage between the reel and the roller, relieving the tension.

To maintain the liquids in the several tanks at an appropriate temperature, means are provided for heating the tanks under the control of a thermostatic switch or the like.

With the above considerations and objects in mind, the invention itself will now be described in connection with a preferred embodiment thereof given by way of example and not of limitation, and with reference to the accompanying drawings, in which:

FIG. 3 is a detail view of one of the film-feed devices shown in FIG. 2.

FIG. 4 is a sectional view taken on line 4—4 in FIG. 1.

Figure 1:
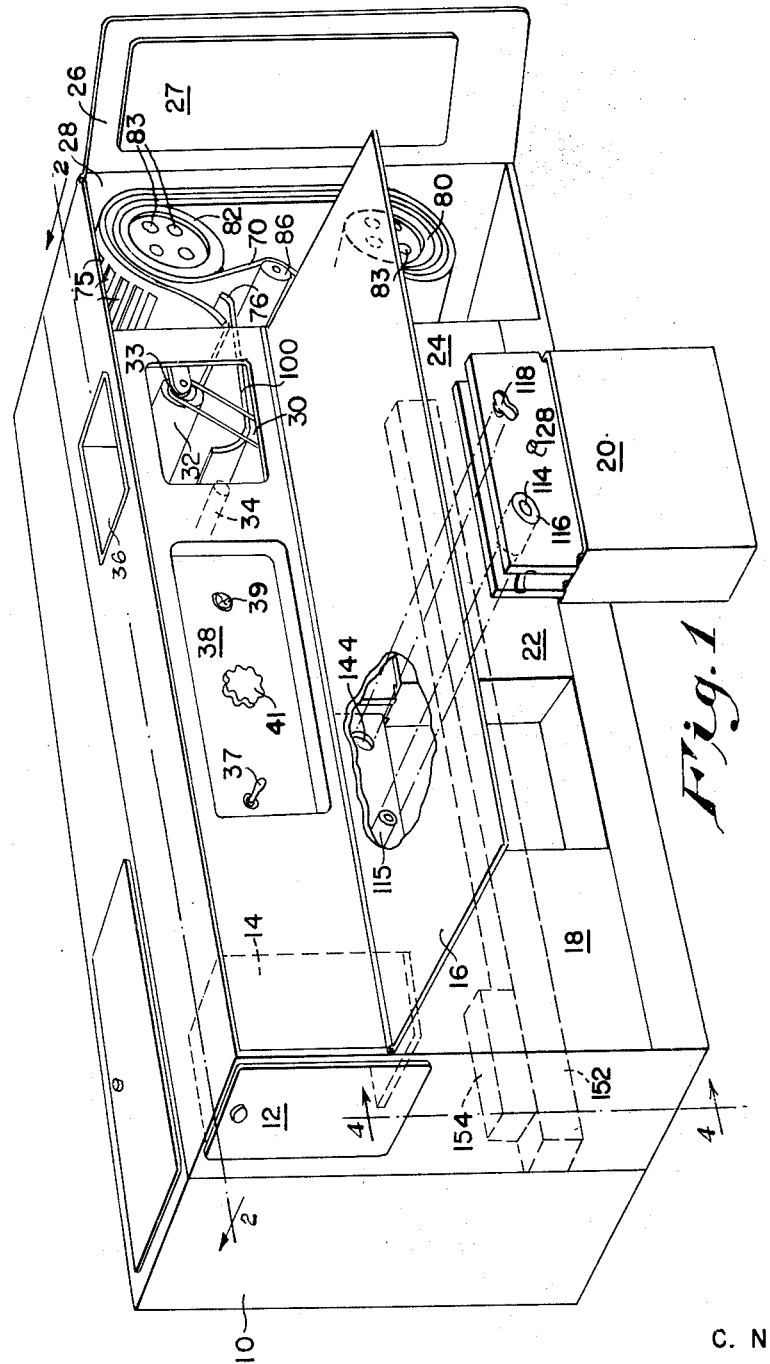
FIG. 1 is a perspective view of the apparatus of the invention as a whole showing the general relationship between the several components thereof, with certain portions removed from their normal position for purposes of clarity.

Referring now to FIG. 1, the film processing equipment of the present invention is shown in a housing 10 having an access door 12 which may be opened to permit mounting of a roll of exposed but undeveloped film in compartment 14, shown in dotted lines in FIG. 1. Access door 16 covers the liquid-processing compartment which includes a plurality of tanks 18, 20, 22 and 24 and which comprises the major part of the lower half of the front of housing 10. A third access door 26 defines the drying compartment 28 in which film is dried after treatment in the liquid-containing tanks 18 through 24. A take-up compartment for reeling dry film onto a take-up spool is indicated generally at 30 and includes a drive roller 32, an idler roller 34 and an opening 36 through which a take-up reel (not shown) is placed upon rollers 32 and 34 in a manner to be described.

The front face of housing 10 also includes a control panel 38 having the several switches necessary for controlling the operation of the apparatus, and including a main power switch 37, an indicating lamp 39 and a speed-control 41. The back portion of housing 10 includes a suitable motor and associated drive mechanism for causing film feed in the tank and drying compartments, as well as a blower motor and a heater for supplying heated air to the drying compartment. In addition, this rear compartment may, if desired, include space for storage of small containers of additional chemicals for use in the tanks, either in liquid or powder form, as well as space for any other objects desired.

Figure 2:
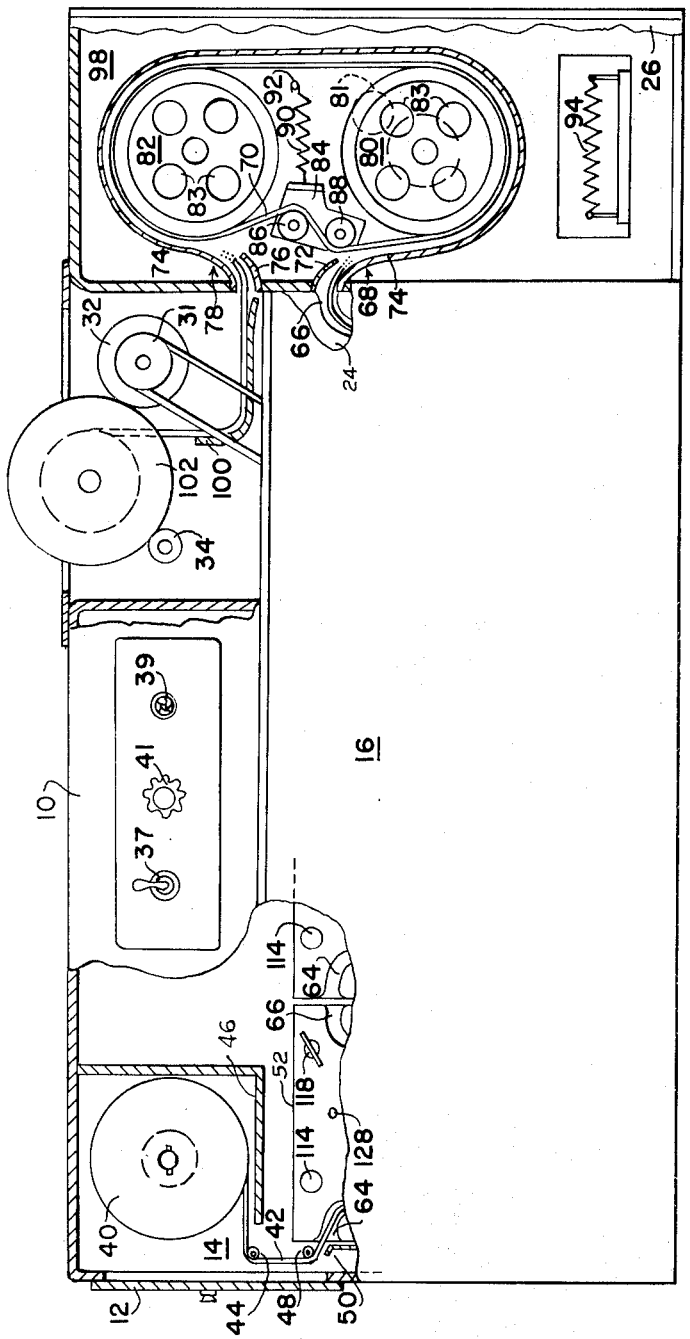
FIG. 2 is a sectional view taken on line 2—2 in FIG. 1.

In order to describe the invention now in more detail, reference is made to FIG. 2. The access door 12 allows placement of a reel 40 of exposed but undeveloped film 42 in the compartment 14. While reel 40 may be mounted upon the usual pivots associated with film reels, it is usually more convenient to the operator of the equipment if the reel need only be placed in the compartment after an initial portion of the film has been threaded into the film feed device in the first tank. In order that this convenience may be provided, a threading roller 44 is positioned approximately level with the base 46 of compartment 14, so that as film is drawn from reel 40 the latter is allowed to slip with respect to base 46. A second threading roller 48 is positioned just below roller 44, and together with film guide 50 serves to guide film 42 into the film-feed mechanism in tank 18.

The tanks 18, 20, 22 and 24 are all identical, and are for the purpose of containing the several liquids which perform the development of the image on the film as it is fed through the tanks. For example, tank 18 may contain a suitable developer, tank 20 a short-stop, tank 22 a fixer, and tank 24 a water bath. It is to be understood that any suitable solutions may be utilized and in any desired order in the tanks; the present invention pertains to the apparatus shown and claimed herein and not to any particular chemistry of development.

In each of the tanks 18 through 24 is a film-feed device 52, which will later be described in more particularly in connection with FIG. 3. In the interests of standardization and interchangeability, the devices 52 are identical and comprise generally a pair of parallel plates 54 between which a main drive wheel is mounted for rotation about an axis perpendicular to the plates. Grooves 58 formed on the inner facing surfaces of plates 54 form a film guide through the device 52 around drive wheel 56. To aid drive wheel 56 in feeding film 42 through the device, idler wheels 60 are mounted on plates 54 in slots radial to drive wheel 56, and are resiliently urged inward to grip film 42 as it passes around the periphery of the drive wheel. As will be described, film 42 is self-feeding from the point at which it first passes between the adjacent perimeters of drive wheel 56 and the first of the idler wheels 60, so that it eventually is fed out of the feed device 52 in tank 18 and into that in tank 20. Each of the film-feeding devices 52 is designed to fit closely against the inner surfaces of its associated tank, and to extend upwardly out of the mouth of the tanks as shown. Means are provided to secure the feed devices to the internal frame of housing 10, and thereby also to secure the several tanks in the housing. As will be described, a quick-disconnect type of securing means is employed so that the time involved in removing one of the tanks and replacing it with a fresh solution therein is minimized.

In order that film 42 be continuously self-feeding through the several tanks, the film guides 58 of each succeeding unit are aligned with the respective film exit ports 66 of the film guide in the preceding unit. As an aid in this self-feeding operation, the entrance ports 64 may be slightly larger than the exit ports 66.

As the film 42 leaves the exit port 66 in tank 24, it enters drying compartment 28 through a film guide 68 which is in alignment with the last exit port 66. Film guide 68 leads the film onto an endless belt 70, and comprises a pair of substantially parallel members 72 and 74. Film guide member 74 extends beyond the guide 68 and closely follows endless belt 70 around the two rotary drums 80 and 82, forming with the belt the main film guide of the drying compartment. In addition, the member 74 forms a film-exit guide 78 in conjunction with film guide member 76.

Endless belt 70 is driven by the rotation of one of the drums 80, 82, either of which may serve as the driving means. In order to keep belt 70 in tight contact with the driving drum, whichever it may be, one of the reaches of belt 70 passes through a belt-tensioning means comprising a pivoted plate 84 which carries a pair of idler rollers 86 and 88, one on either side of belt 70, and a spring 90 which extends between plate 84 and a fixed stud 92. Plate 84 is pivoted at the axis of roller 88, and the pull exercised by spring 90 causes plate 84 to tend to move in a clockwise direction (as seen in FIG. 2) and lengthen the path which belt 70 must travel. Belt 70 is preferably made of some suitably flexible porous material, the porosity serving to accelerate the drying process.

Suitable heating means, such as the electrical heating coil 94, are mounted in a duct 96 which connects an air blower 150 (FIG. 4) with drying compartment 28 to supply heated air thereto. Film guide member 74 is perforated throughout a greater portion of its length, and is mounted on a back plate 98 which closes the back side of drying compartment 28 except for hot air exhaust ducting behind drums 80 and 82. When access door 26 is closed, the plate 27 thereon closes tight against the front side of the area generally defined by the member 74 and the endless belt 70, and the heated air which is directed into drying compartment 28 is forced through apertures 75 in member 74 and over the film to be dried. As the heated air impinges upon the film, the latter is pressed against the endless belt to effect a friction drive between the two. After passing over and drying the film, the air escapes from the drying compartment through apertures in the two drums, and then to the aforementioned ducting (not shown) which communicates with the exterior of housing 10.

After the film 42 leaves drying compartment 28, it passes into take-up compartment 30, and is guided by a film guide 100 in an upward direction for reeling onto a take-up spool 102. As in the case of supply reel 40, no mounting pivots are required for reel 102, since the latter may be positioned in compartment 30 by merely resting its rims on drive roller 32 and idler roller 34. As drive roller 32 rotates, the reel 102 is rotated to take up the film 42. As the diameter of the film wound on reel 102 increases, the linear speed of take-up per revolution increases, and since drive roller 32 is driven at the same speed as the previous film-feed units, the increased tension on the film would soon cause it to break if it were not for the fact that spool 102 is free to slip on drive roller 32. This take-up system thus offers the concomitant advantages of simplicity in the installation of a take-up reel and saving in engineering and parts expense in avoiding the necessity for a complicated gearing system which would be necessary if the take-up reel were to be driven at a speed variable (in accordance with the amount of film taken up on the reel) with respect to the film-advancing means in the prior compartments.

FIG. 3 is a more detailed view of one of the insert-type film drive devices 52, with portions broken away for additional clarity. The parallel plates 54, which may be of any suitable material which is structurally strong and which will not be adversely affected by the solutions in the several tanks, are spaced apart by means of several dowels 104. Drive wheel 56 is mounted between plates 54 for rotation about a shaft 106, and secured to drive wheel 56 and rotating about the same axis is a spur gear 108. Drive wheel 56 is hollow and has side apertures 110 which are in registry with matching apertures in spur gear 108. Similar apertures 111 in plates 54 allow fluid to enter apertures 110. Inside drive wheel 56 a plurality of projections or paddles 112 are spaced around the inner perimeter, and upon rotation of the drive wheel in the solution within a given tank, these paddles serve to stir the solution to keep it in a state of agitation. Near the top of plates 54 are a pair of holes 114 which are in registry and which receive a locating pin 115 from the inner frame 144 of housing 10 as is better seen in FIG. 1. Coaxial with holes 114 is a hollow dowel 116, which also serves as a spacing element between the plates 54. Through a similar pair of holes (not shown) there extends a fastener 118 for securing the assembly 52 to the inner frame 144 of housing 10. Fastener 118 is preferably of the quick-disconnect type so that the assembly 52 and its associated tank may easily be removed in order to change the solution therein, and may comprise any of the quarter-turn or half-turn fasteners which are well known in the art.

On the inner or facing surfaces of each of the plates 54 there is a film-guiding groove 58, which may be formed by any desired means or process, the grooves in the two plates being in registry with each other. At one end of grooves 58 a flared portion 64 serves as an entrance port or mouth into which film is fed for passage around drive wheel 56. As film is introduced into port 64, each edge of the film is within one of grooves 58, and as long as the film does not buckle laterally it will be guided around drive wheel 56 and out exit port 66. Both entrance port or mouth 64 and exit mouth 66 are flared in both the vertical and horizontal planes as an aid in the self-feeding of film through the device. It will be noticed that the flare of entrance mouth 64 is shown as greater than that of exit mouth 66, so that as film issues from the exit port 66 of one of the film-feeding devices 52, it will easily be guided into the larger entrance port 64 of the succeeding unit, but this requirement is obviously not essential. As may better be seen in FIG. 4, the side walls of grooves 58 are also flared outwardly as an aid to self-feeding and to avoid scratching of the film edges. Experimentation has shown that film widths of up to 70 millimeters satisfactorily pass through this type of film guide without buckling, and the apparatus of this invention is therefor suitable for motion picture film of widths as small as 16 millimeters, as well as for the common serial and still-shot widths of 35 and 70 millimeters. As may be seen, the film guide formed by grooves 58 extends from entrance port 64 around to a point where the center line thereof tangentially meets the periphery of drive wheel 56 at the point of contact of the first of the idler wheels 60.

As previously stated, idler wheels 60 are mounted for limited motion in directions radial of drive wheel 56. This action is accomplished by means of slots 120 in which the shafts of idlers 60 are free to slide. Spring tension means, which may take the form of resilient bands 122, are provided to urge idler wheels 60 constantly toward the center of drive wheel 56. In the form shown, each of bands 122 passes around opposing pairs of pulleys 124 which are secured to the shafts of idlers 60. Of course, a similar set of pulleys and resilient bands are likewise employed on the reverse side of the assembly in order to maintain the shafts of the idlers parallel to that of drive wheel 56. It will be understood that the tension of the resilient bands is great enough to maintain the feed of the film as it passes between the idlers and the drive wheel, but that it is not so great as to prevent easy entry of the lead end of the film as it is self-fed through the device.

As is well known in the art of photographic processing, it is desirable to agitate the solutions in which the film or paper is immersed for developing, fixing and the like. To this end, the previously described paddles 112 on the inner perimeter of drive wheel 56 add to the stirring of the solution which arises by mere motion of the drive wheel and the chopping effect produced by the apertures 110. Also, the relative motion of the film and the solution, as the former is guided along the grooves 58 and over drive wheel 56 with the emulsion side outward from the drive wheel, provides an additional stirring effect to keep fresh solution flowing against the emulsion. Finally, the squeezing contact of idler wheels 60, which present smooth resilient surfaces to the emulsion side of the film, aids in agitating the solution that is adjacent the emulsion.

Spur gear 108, to which is secured the drive wheel 56 for rotation therewith, engages a second spur gear 126 whose shaft 128 is mounted for rotation in the plates 54 about an axis parallel to that of drive wheel 56. Also on shaft 128 and near the end opposite from spur gear 126 are a pair of diametrically opposed studs 130 which extend from a shaft portion 132 of enlarged diameter (shown in dotted lines in FIG. 3). Alternatively, spur gear 126 may be replaced by a suitable puck drive or the like.

A clearer understanding of the means for causing rotation of drive wheel 56 may be had by referring to FIG. 4. A motor 134, which may be of any suitable type for providing variable speed output in accordance with the setting of control knob 41 on instrument panel 38 on the front face of housing 10, has a shaft 136 to which is affixed a sprocket gear 138. At the end of shaft 136 remote from motor 134 there is secured a disc 140 which carries a pair of studs 142 which extend in a direction parallel to that of shaft 136. When tank 18 and its associated film-feed unit are secured to frame 144 by means of fastener 118, shafts 136 and 128 are coaxially aligned and the latter is closely adjacent disc 140 so that studs 130 cooperate with studs 142 to cause rotation of shaft 128 upon rotation of shaft 136. Sprocket gear 138 engages a link chain 146 which in turn drives similar sprocket gears 138 associated with the subsequent film-feed devices in tanks 20 through 24, as well as a sprocket gear (not shown) for similarly driving drum 80 in drying compartment 28. In addition, chain 146 engages a further sprocket gear not shown which, through suitable one-to-one gearing or a belt and pulley arrangement 31 as indicated in FIG. 2, causes rotation of drive roller 32 in the take-up compartment. Thus, the film drive means in each of these compartments are all driven synchronously at a speed determined by the setting of a front-panel control, which may take the form of an adjustable resistor in the supply circuit of motor 134. If preferred, the drive to roller 32 may itself provide some slippage (as by a spring belt) to aid in the smooth take-up of film on reel 102.

Indicated schematically in FIG. 4 are the blower motor 148 and blower 150 previously referred to in connection with FIG. 2. In order that the solutions in the several tanks be kept within a suitable temperature range, a heating element 152 is positioned adjacent the back sides of these tanks, as by being mounted on frame member 156. As may be seen in dotted lines in FIG. 2, heater 152 is of sufficient length to bear against and provide heat for all of the several tanks 18 through 24. Heater 152 may take any suitable form, but is preferably an elongate electrical resistance type heating means in a housing, the material of which is a good conductor of heat. Similarly mounted on frame member 156 but adjacent the back side of only one of the several tanks 18 through 24 is a temperature-sensitive switch or other suitable thermostatic means 154 which controls the energization of the heater 152 to maintain the solution in the tanks within a desired range for satisfactory operation. It has been found satisfactory to monitor the temperature of only one of these tanks, since the heater supplies substantially the same amount of heat to each, and since they are all within the housing 10 and therefore at approximately the same environmental temperatures. If desired, of course, a plurality of thermostats could be provided, one for each tank. An indicating lamp 39 on front panel 38 is in circuit with thermostat 154 in such manner that it is energized when the main power switch is turned on and remains energized until the solution temperature reaches the desired level.

With reference now to the operation of the apparatus of the invention, the operator first turns the power on at the main switch 37, thereby energizing drive motor 134, blower motor 148, solution heater 152, drying compartment heater 94 and indicating lamp 39. After an initial period of warm-up, the solutions in the several tanks reach the desired temperature, and thermostat 154 is thereupon actuated to de-energize heater 152. As solution heater 152 is thus de-energized, the circuit to indicating lamp 39 is also interrupted. When the operator sees that indicating lamp 39 no longer is lit, he may proceed with the operation of the apparatus.

Access door 12 is opened, and the lead end of an exposed but undeveloped film 42 is passed over threading roller 44 and under threading roller 48, through film guide 50 and into entrance mouth 64 of the film guide formed by grooves 58 in the film-feed device 52 in tank 18. The lead end of film 42 is hand-fed into grooves 58 until it passes tangentially between drive wheel 56 and the first of idler wheels 60. As stated previously in connection with the description of FIG. 3, the film is introduced into the device with its emulsion side away from wheel 56 so as to be in contact with the fluid in the tanks. As the film passes between these two wheels, the idler moves radially outward from drive wheel 56 an amount sufficient to allow the film to pass therebetween but to be firmly gripped thereby. Once the film is thus gripped, it is thereafter self-feeding, and therefore the reel 40 on which film 42 is rolled may be placed in compartment 14, as shown, with its rims resting on base plate 46. Access door 12 is then closed, and the remainder of the operation of the apparatus is automatic.

By virtue of the energization of drive motor 134, shaft 136 and sprocket gear 138 are rotated, as is disc 140. As this disc rotates, studs 142 rotate free until they abut the cooperating studs 130 on shaft 128, causing the latter to rotate with shaft 136. Spur gear 126, which is secure to shaft 128, is thereby rotated, and it in turn causes rotation of spur gear 108 and drive wheel 56. As the latter rotates, each of idler wheels 60 is similarly rotated by virtue of their frictional contact on the drive wheel. This operation obtains irrespective of whether film 42 is passing between the drive wheel and the idlers. Film 42 is thus advanced around the greater portion of the periphery of drive wheel 56 as determined by the positioning of grooves 58 in plates 54, and finally it is fed out through exit mouth 66 and into the somewhat larger entrance mouth 64 of the feed unit 52 in tank 20.

Link chain 146, which is driven by the rotation of sprocket gear 138, similarly engages other sprocket gears not shown but likewise disposed with respect to the respective tanks 20 through 24. In like manner, each of these remaining tanks has associated with it a drive linkage comprising elements identical with disc 140, studs 142 and 130 and shaft 128. As a result, as film 42 automatically advances into the film-feed unit 52 in tank 20, it is gripped between drive wheel 56 therein and the first of the associated idlers. Film 42 subsequently passes under each of the remaining idler wheels 60 in each of the remaining tanks, and it finally issues from exit port 66 in the film-drive unit in the last tank 24. As an incidental feature, the pressure exerted by the last idler wheel in each of the tanks also serves to reduce the amount of the solution that clings to the film, thereby tending to alleviate any problems that may arise in connection with mixing of the several solutions by carry-over from one tank to the next.

After the film leaves the last tank 24, is passes into film guide 68 in drying compartment 28, by means of which it is lead onto the endless belt 70. One of the rotary drums 80 and 82 is driven by any suitable means such as the pair of spur gears indicated at 81 and extending between drum 80 and the shaft of a sprocket which engages the drive chain 146. Belt 70 is thereby driven in a counter-clockwise direction as viewed in FIG. 2 to aid in carrying the film 42 around the path defined by apertured film guide member 74. The air flow created by blower 150 passes over heating coil 94, and is directed into compartment 28 by duct 96. Since this compartment is closed to air flow except between film guides 68 and 78 and is closed even at this point by the combination of film guide member 74, back plate 98 and front plate 27 (when door 26 is closed), the heated air is forced through apertures 75 in film guide member 74 and over the film 42 to subsequently escape to ducting not shown by means of apertures 83 in drums 80 and 82. As stated above, the heated air impinges on film 42 and thereby presses the film against the belt 70 to effect a friction drive between the two. By the time that film 42 issues from film guide 78, it has been satisfactorily dried by the flow of heated air, and is ready to be reeled up on take-up spool 102.

As film 42 leaves drying compartment 28, it is directed upwardly by means of film guide 100 so that it may be threaded onto the reel 102. After such threading, the reel is lowered into aperture 36 and allowed to rest on its rims on drive roller 32 and idler 34. Drive roller 32 is driven in sychronism with the drive chain 146 by any suitable means such as a belt indicated at 33 and extending between a pulley at the roller and another driven by the chain. The particular means for driving roller 32 is not important as long as the roller is driven at least as fast as the drive wheels 56 in the several tanks, so that continuous take-up is assured. As more and more film is wound up on reel 102, the diameter of the film thereon increases and the linear take-up per revolution of the spool increases accordingly. Since the rotary drive applied to reel 102 is constant with respect to the speed of drive chain 146 which drives all of the preceding drive units, the film would be subjected to ever-increasing tension at take-up reel 102 if it were not for the fact that the reel is allowed to slip on drive roller 32, thus providing automatic self-correction of the tension on film 42. Alternatively, additional slippage between reel 102 and drive chain 146 may be provided by utilization of a spring belt or the like at 33.

The invention has been described above in considerable detail, and particularly with reference to its application to the development of roll-type photographic film in which there is employed a separate tank for the developer, the short-stop, the fixer and the water. However, it will be readily apparent to those skilled in the art that the invention is also applicable to other photographic processes. For example, other processes may employ either fewer or additional solutions, there being a number of tanks in the apparatus corresponding to the desired number of solutions or to the number of different times that the film is to be immersed in a given type of solution. Further, the film or other elongate material which is advanced through the apparatus as described may be other than photo-sensitive and yet require processing through one or more tanks of some suitable solutions with subsequent drying and reeling onto a take-up spool. Also, many of the structural details shown are merely illustrative of a preferred form and may be changed to other forms without departing from the inventive concept of the present invention. For example, the take-up arrangement comprising rollers 32 and 34 may be replaced by any of the well known take-up devices of the prior art, so long as a suitably variable drive is effected. Hence, the invention is not to be considered as limited to the particular details given, nor to the specific application to which reference has been made during the description of the apparatus, except insofar as may be required by the scope of the appended claims.

What is claimed is:

1. A drying device for photographic film, comprising an enclosure having front, back and side walls and film entrance and exit ports in one of said side walls, a pair of drums mounted for rotation about parallel axes extending perpendicular to said front and back walls, an endless porous belt passing over said drums and extending therebetween, means for tensioning said belt into frictional contact with portions of the cylindrical surfaces of said drums, a film guide plate member extending from a position adjacent said entrance port and wrapped about the path of said belt over said drums and terminating at a point adjacent said exit port, said film guide plate being spaced a short distance from the surface of said belt throughout a major portion of its path so as to define therewith a narrow film channel from said entrance port and about said drums to said exit port, and said film guide plate having a width dimension filling the space between said front and back walls of said enclosure, and being apertured to allow the passage of air into said film channel from the remainder of said enclosure, in a direction tending to urge film in said channel against said belt, means for supplying heated air to said enclosure and thence via said apertures to said channel, and means for rotating one of said drums and thereby advancing said belt so as to carry along film lying in said channel, and to propel it through said drying device from said entrance port to said exit port.

2. A drying device for photographic film, comprising an enclosure having front, back and side walls and film entrance and exit ports in one of said side walls, a pair of drums mounted for rotation about parallel axes extending perpendicular to said front and back walls, an endless porous belt passing over said drums and extending therebetween, means for tensioning said belt into frictional contact with portions of the cylindrical surfaces of said drums, a film guide plate wrapped about the path of said belt over said drums and spaced a short distance from the surface of said belt throughout a major portion of its path so as to define therewith a narrow film channel; said film guide plate being apertured to allow the passage of air into said film channel from the remainder of said enclosure, in a direction tending to urge film in said channel against said belt; means for supplying heated air under pressure via said apertures to said channel, and means for rotating one of said drums and thereby advancing said belt so as to carry along film lying in said channel, and to propel it through said drying device from said entrance port to said exit port.

References Cited by the Examiner

UNITED STATES PATENTS

| | | | |
|---|---|---|---|
| 2,414,580 | 1/47 | Birdseye | 34—122 X |
| 2,861,508 | 11/59 | Baumbach | 95—94 |
| 2,907,259 | 10/59 | Horn et al. | 95—94 X |

NORMAN YUDKOFF, *Primary Examiner.*